Patented Apr. 20, 1937

2,077,870

UNITED STATES PATENT OFFICE 2,077,870

STABILIZING UNSET CONCRETE

Warren L. Beuschlein, Ira L. Collier, and
Claude D. Cory, Seattle, Wash.

No Drawing. Application December 27, 1932,
Serial No. 648,984

2 Claims. (Cl. 106—27)

This invention relates to the manufacture of cement and of concrete. The objects of the invention are first, to provide a hydraulic cement which permits a reduction of the water used to form unset concrete and thereby improves the strength of said concrete when set, second, to make concrete more homogeneous and third, to provide an unset concrete of improved workability, said enhanced qualities constituting properties of stabilized unset concrete.

The advantages derived from the use of our invention depend upon the reduction in the amount of water heretofore used in mixing concrete which can be made without loss of workability. Designing a concrete for a given strength consists in selecting the water-cement ratio corresponding to the strength desired, and then finding the most suitable combination of mineral aggregates which will give the desired workability when mixed with the cement and water. It has been customary to use water greatly in excess of the amount which actually enters into chemical combination with the cement in order to produce unset concrete of sufficient workability for placing around reinforcement and in forms. This excess of water is known to weaken concrete, to cause segregation of the aggregates, to produce voids and stone pockets and to cause the formation of porous concrete.

We have found by experiment that our stabilized unset concrete has improved uniformity of composition, and that it can be hauled long distances without losing said uniformity. The proper use of our cement allows less water to be used in unset concrete for the same plasticity or workability, thereby decreasing the water-cement ratio which is the object when set concrete of greater strength is desired.

The novelty of our invention resides in the reduction of the surface tension of the aqueous phase of unset concrete. It is well known that reduction of surface tension increases the surface area obtainable from a given quantity of liquid as evidenced, for example, by the foaming properties of soap solutions and the like. The reduction of surface tension of the aqueous phase of unset concrete permits more uniform distribution of said phase, less tendency for segregation of aggregate, and a reduction of water-cement ratio without loss of workability. The pronounced aqueous surface tension reducing characteristic of soaps is well known, but the application of this characteristic for the manufacture of more stable unset concrete is new. While we prefer to use soaps, we have found that other aqueous surface tension reducing substances will produce stabilized concrete.

It is well known that organic matter lessens the compressive and tensile strengths of concrete and it is an object of this invention to obtain stability of concrete with a minimum of organic matter. To accomplish this, we eliminate excessive or undissolvable organic matter and wish to use that amount which will dissolve in mixing water. Whereas it is necessary for purposes of water proofing concrete, to distribute said excessive organic matter in emulsions by means of oil or finely divided solids such as bentonite, diatomaceous earth and the like, by means of our invention, said excessive organic matter is eliminated and greater ease of application is possible by solution rather than by uniform dispersion of small undissolved particles. Coal tars, and other emulsification agents, are undesirable for purpose of carrying concrete stabilizing agents since they depress the solubility and rate of solution of said agents in the aqueous phase.

Experiments by us have shown that the aqueous solution forming one component of our improved unset concrete has a surface tension less than that of water and in some experiments, less than 55 dynes per centimeter at 20° C. We prefer the use of those organic salts which produce surface tensions of said aqueous component of less than 55 dynes per centimeter at 20° C., as we have found that smaller quantities of such salts mixed with hydraulic cement can be used to form our stabilized cement and concrete.

Our stabilizing cement comprises a mixture of hydraulic cement and an aqueous surface tension reducing compound. As an example of our invention, 100 pounds of hydraulic cement are mixed with one pound or less of a soap. The method of mixing is immaterial as the soap may be added to the dry hydraulic cement or to a hydraulic cement-water slurry prior to its use in concrete or grout; furthermore, the soap may be mixed with sand or other aggregate prior to the addition of hydraulic cement. It is obvious that the most economical manufacture of our stabilizing cement may take place during the grinding of cement clinker wherein the stabilizing agent can be added and uniformly distributed among the ground cement particles. The property of stabilization does not manifest itself until water, or water and aggregate are added to our improved cement.

Soaps which we have found useful comprise those in which the metals of the 3d, 4th, or 5th analytical groups are in combination with rosin or the fatty acids of more than twelve carbon atoms. The following metals are included in the third, fourth, and fifth analytical groups: iron, aluminum, titanium, uranium, manganese, zinc, nickel, chromium, cobalt, calcium, magnesium, barium, strontium, sodium, potassium and ammonium. We prefer mixing manganese resinate with hydraulic cement, as we have found by experiment that very small quantities of this soap, even in the proportions of 1 to 1600 of cement, produce unset concrete of improved stability. Other compositions, for example, showing this improved property are made by mixing hydraulic cement with magnesium oleate, aluminum palmitate, calcium stearate, sodium caseinate and sodium linolate, etc., respectively.

In addition to metal soaps, we have found that an improved stabilized unset concrete is formed from cement and small quantities of rosin, casein or the higher fatty acids. The use of such acids is a further illustration of the effect of the addition of metal soaps to cement as it is well known that metal soaps will be formed in situ from the bases present in cement when the aforementioned acids are mixed with cement and said mixture is wetted with water.

This specification not only discloses the aforementioned stabilizing cement compositions, but also the process of manufacturing an improved or stabilized unset concrete which comprises mixing mineral aggregate, water and hydraulic cement with a single solute which is capable of reducing the surface tension of the aqueous phase. While we prefer as the single solute those organic salts which lower the surface tension of said aqueous phase to less than 55 dynes per centimeter at 20° C., we do not limit our invention thereto, as we have found the stability of unset concrete substantially proportional to surface tension lowering. Other organic salts effective for the manufacture of stabilized unset concrete are those containing more than twelve carbon atoms, examples of which are soaps, resinates, caseinates and those salts and acids recited in the above composition disclosure.

As a further example of our process, unset concrete may be prepared by any of the customary methods of mixing and the aqueous surface tension reducing solute added with the water, mineral aggregate, or cement. When our stabilized cement is used, the hydraulic cement and the salt are caused to enter the mixing apparatus as one component of the ensuing mixture.

Whereas admixtures comprising soaps, tars, and emulsifying agents are used for purposes of waterproofing set concrete, our improved cement composition differs therefrom by promoting in unset concrete improved workability, uniformity during transportation, hauling, and placing around reinforcement and in forms, and reduction of water-cement ratio, said properties being descriptive of unset concrete in contradistinction to waterproofing pertaining to set or hardened concrete. Insoluble soaps for waterproofing purposes must be uniformly distributed in order that the small interstices between solids be plugged with soap, which process necessitates the presence of undissolved and well distributed soap particles. The stabilization of unset concrete depends upon reduction of surface tension of the aqueous phase which is only caused by solution of certain substances in said phase. It is well known that the surface tension of aqueous solutions varies over a wide range. It is the object of this invention to increase the strength of set concrete as much as possible while being aware that the presence of organic matter tends toward a reduction in strength, hence we are desirous of using those substances which lower the surface tension of water greatly per unit weight. The presence of excess or undissolved soap and the like would defeat the purpose of our invention in that strengths would not be maxima. Since solution of stabilizer is desirable, uniform distribution of solute is easily accomplished while cement, mineral aggregate and water are being mixed.

Having thus described the nature of our composition and processes of stabilizing unset concrete, we claim:

1. The method of producing stabilized unset concrete which comprises incorporating in the concrete an amount of manganese resinate sufficient to reduce the surface tension of the aqueous phase to a value equivalent to not more than about 55 dynes per centimeter at 20° C.

2. The method of producing stabilized cement which comprises grinding cement clinker in the presence of manganese resinate, thereby to produce a dry, intimate mixture comprising cement and manganese resinate.

W. L. BEUSCHLEIN.
IRA L. COLLIER.
CLAUDE D. CORY.